Jan. 28, 1941. F. OLSEN ET AL 2,230,119
PROCESS OF PRODUCING WOOD CELLULOSE
Filed Feb. 18, 1937   2 Sheets-Sheet 1
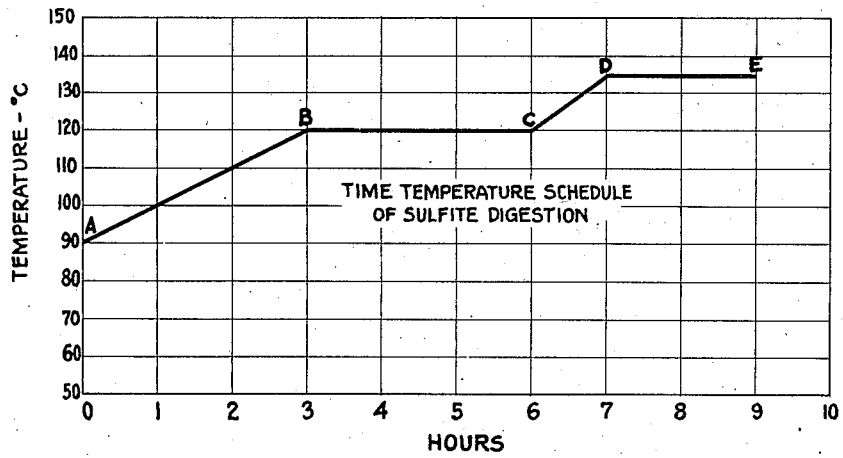
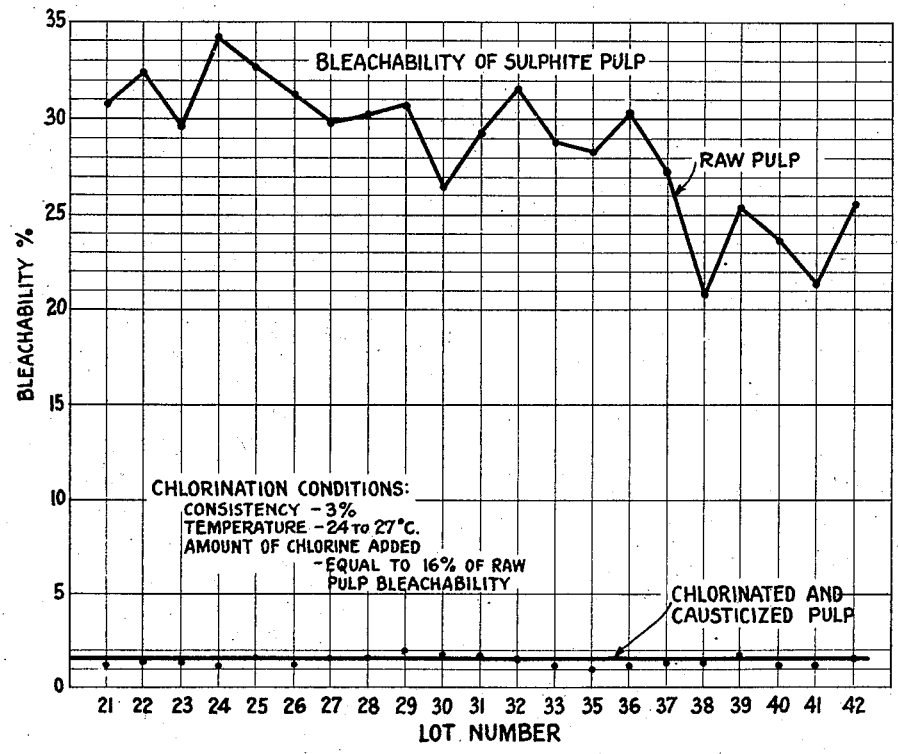

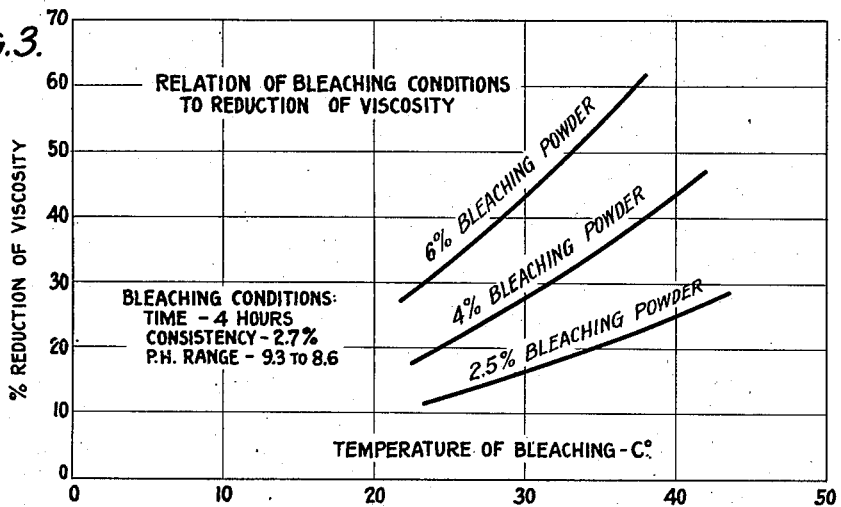
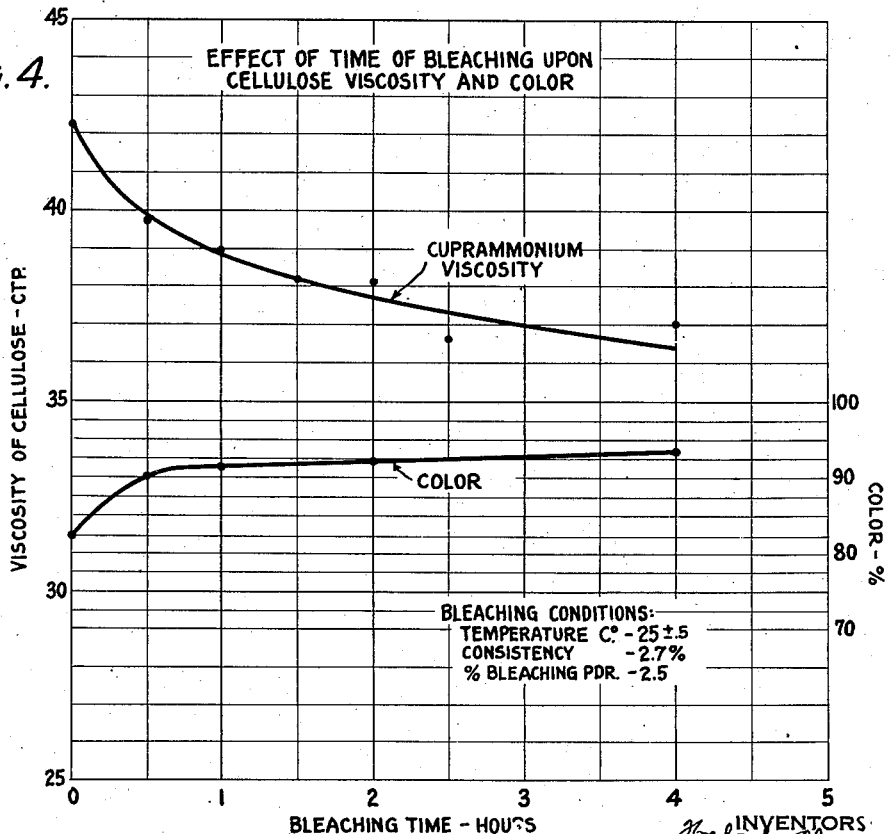

Patented Jan. 28, 1941

2,230,119

UNITED STATES PATENT OFFICE 2,230,119

PROCESS OF PRODUCING WOOD CELLULOSE

Fredrich Olsen, East Alton, and Lionel Goff and Lyle Melvin Sheldon, Alton, Ill., assignors to The Cellulose Research Corporation, East Alton, Ill., a corporation of Delaware Application February 18, 1937, Serial No. 126,363

4 Claims. (Cl. 92—11)

This invention relates to the production of wood cellulose suitable for derivative purposes and in particular for viscose products.

A primary object of the invention is to provide a purified wood cellulose, possessing chemical and physical properties rendering it especially suited for viscose purposes.

Another object of the invention is to provide a process for converting wood into purified cellulose of high yield, suitable for preparing viscose products, such as yarn and sheeting.

A further object of the invention is to provide a process for converting wood into purified cellulose, suitable for xanthation, comprising a coordinated sequence of treatments controlled in such a manner that exceptional uniformity of chemical and physical properties between successive batches of cellulose is insured.

Other objects will be obvious.

Until recent years purified cotton linters were the sole source of the raw cellulosic material for producing viscose yarn and sheeting. One of the practical difficulties found in the use of cotton linters arises from the non-uniformity of the chemical and physical characteristics between successive batches of the cellulose material when xanthated and subsequently treated. This is partially overcome by selecting purified linters derived from cotton grown in the same geographical region, thus eliminating the influence of seasonal variations in climatic conditions. Recently, purified wood cellulose, especially material derived from spruce wood, has been successfully used in the viscose industry in conjunction with purified linters by carefully blending the two base materials. However, the physical and chemical properties of such purified wood celluloses also vary to a considerable degree between successive lots. Consequently, the practical difficulty arising from the non-uniformity of the cellulose products is not overcome by the blending operations. The increasing demand of the viscose industry for a lower cost base cellulosic material has stimulated wood pulp manufacturers to provide a more satisfactory product. The chief contribution by the pulp manufacturers has been an improved purity of product, but the variability of the properties of the cellulose persists, so that an adequate supply of cellulosic material having entirely uniform properties between successive batches is not available to the viscose industry.

It is a primary object of this invention to provide a base wood cellulosic material of high purity, suitable for xanthation purposes and possessing chemical and physical properties that are capable of very close duplication from batch to batch, thereby meeting the aforesaid requirement of the industry.

It has been found that such uniform and duplicable characteristics of cellulosic material can be obtained in converting wood to viscose pulp by a control of the following treatments,. (1) a uniform digestion and pulping of the wood, (2) a uniform chlorine delignification and alkaline treatment of the pulp, and (3) the control of the cuprammonium viscosity of the cellulosic pulp during a uniform bleaching treatment.

In the accompanying drawings which illustrate certain features of the present invention:

Figure 1 illustrates a typical time-temperature digestion schedule.

Figure 2 shows certain bleachability characteristics of cellulosic pulp before and after chlorination.

Figure 3 illustrates the relation between temperature of bleaching, with certain standard conditions, and the percent of viscosity reduction.

Figure 4 illustrates viscosity reduction and improvement in pulp color with relation to time of bleaching.

To obtain a uniform digestion and pulping of the wood, it has been found essential to secure a uniform association of treating reagents with the wood before reactive temperatures are reached. This can be accomplished by impregnating the wood with the treating reagent prior to digestion. A very efficient and practical method of attaining this impregnation comprises a series of treatments consisting of boiling the wood in water until the air is substantially removed, draining the excess water, steaming the wood to further remove at least a part of the residual water held in the pores of the wood while excluding the re-entry of air. A sulfite delignifying liquor is then added, preferably at elevated temperature. All of the treatments are carried out under conditions hereinafter described in detail. As a result of these treatments, the wood is uniformly and readily saturated by the sulfite cooking liquor. It may then be pulped by any of the usual well-known temperature-pressure schedules employed in the sulfite industry. However, the proper pre-impregnation of the wood permits a shorter cooking time than is permissible in the usual practice and it is preferred to take advantage of this fact by using a lenient schedule similar to that shown in Figure 1.

The preimpregnation practice of the present invention results in a higher yield of undegraded pulp for a given bleachability in a shorter cooking time and gives a far more uniform wood pulp of any desired viscosity than is obtained by the prior practices. Since the reduction of viscosity may be readily and most efficiently controlled by the hypochlorite bleaching treatment, hereinafter described, without any substantial degradation of the cellulose, when the amount of adjustment involved is relatively small, the digestion conditions are controlled to insure a cuprammonium viscosity of the raw pulp within a few centipoises of the value desired in the purified pulp. Thus, the subsequent purification treatments employed result in a higher quality of pulp for any given viscosity.

A uniform chlorine delignification can be accomplished by introducing an amount of chlorine in pounds per hundred pounds of cellulose equal to 14% to 18% of the bleach value of the wood pulp into a vigorously agitating pulp-water slurry. Each part of the unchlorinated pulp rapidly reacts with just its quota of the total amount of chlorine. Substantially all of the chlorine is consumed in less than twenty minutes. Any amount of chlorine appreciably greater than the equivalent of 18% of the bleach value is not rapidly consumed and results in a deleterious oxidizing and depolymerizing action on the cellulose. Less than the equivalent of 14% of the bleach value results in incomplete purification and is therefore less satisfactory.

After chlorination the cellulose may be treated in a variety of ways, depending on the alpha cellulose content and bleachability desired, without impairing the uniformity of product. However, it should be understood, that having determined the alkaline treatment to be used, it will be necessary to use this same treatment on successive batches in order to have uniformity of cellulose properties between the batches. For instance, after exhaustion of the chlorine, sufficient alkali may be added to the slurry to effect a 1% initial equilibrium caustic concentration, the slurry heated to boiling and held for 30 minutes. After washing the pulp, preferably until neutral, the cellulose will usually have an alpha cellulose content of greater than 90% and a bleachability of about 1.5%. On the other hand, after exhaustion of the chlorine, only an amount of alkali may be added sufficient to neutralize the acid present, and the pulp is then washed free of reagents. This will result in a higher yield of pulp having usually slightly less than about 90% alpha cellulose content and about 4% bleachability. It is preferred not to add the alkali to the pulp slurry in concentrations greater than about 7% for the treatment at elevated temperatures after chlorination, since such higher concentrations tend to "set" the color and make subsequent bleaching more difficult. In Figure 2 is shown the uniformity in the bleach values of the chlorinated pulp when it is given a treatment similar to that described above in the first instance.

It has been found that the cuprammonium viscosity is an index which serves as a valuable integrator of the effects of treatments in the history of the cellulose. Furthermore, the properties imparted to the cellulose by the treatments to which it has been subjected influence the manner in which it reacts with the xanthating mixture and are related to the strength properties of the viscose products. Furthermore, the cuprammonium viscosity of the cellulose affords an important indication of the duplicability of the properties of the cellulose in different batches or lots.

The cuprammonium viscosity of the cellulose can be controlled during bleaching treatments to any desired viscosity within the range of 5 to 30 centipoises and duplicated between successive batches within very narrow limits without any marked degradation of the cellulose. This viscosity control is attained without detracting from the purifying and decolorizing action obtained in the usual bleaching practice.

When cellulose is subjected to treatment with a hypochlorite solution, a fairly rapid drop in cuprammonium viscosity of the cellulose occurs in the initial stages of the treatment. This is followed by a period in which the rate of reduction is considerably lessened (see Figure 4). In carrying out the present invention the hypochlorite treatment is continued until the approximately level portion of the viscosity reduction curve is reached. In this manner the treatment may be readily terminated at the desired viscosity level since the rate of reduction is relatively small at this point and the desired time to give the required value can be calculated with precision. It is preferable not to cause a reduction in viscosity greater than 10 to 20 centipoises, since a greater reduction of viscosity may result in undesirable degradation of the cellulose, as measured by the alpha cellulose content and soda soluble content of the cellulose.

Four major variables of the bleaching treatment should be correlated to control the rate and extent of viscosity reduction, namely, the pH of the solution, the concentration of hypochlorite in the solution, and the time and temperature of treatment. By increasing the pH of the solution from 7.0 upward, the rate and extent of viscosity reduction decreases. Increasing the concentration of hypochlorite in the solution increases the rate and extent of viscosity reduction. Increasing the time of treatment increases the degree of viscosity reduction to a limited extent only, as shown in Figure 4. Increasing the temperature of treatment increases both the extent and rate of viscosity reduction (see Figure 3).

Therefore, being given the original viscosity of the material to be treated, by running a limited number of control treatments it is possible to establish control curves similar to those shown in Figures 3 and 4 in which three of the above mentioned variables are held constant and the fourth is varied to obtain the desired cellulose viscosity. It has been found convenient in most cases to hold the pH, concentration of hypochlorite, and the time of treatment constant and to vary the temperature (as shown in Figure 3). However, it is to be understood that the present invention is not limited to control of temperature of treatment in reducing the cuprammonium viscosity. Control of this variable is shown by way of illustration only and any minor variations at a given viscosity level may also be very conveniently controlled by varying the time of bleaching.

The pulp product obtained can be controlled to a high degree of uniformity between successive batches by means of the above described treatments. For example, the alpha cellulose content can be controlled to a fixed value within ±0.3%, the soda solubility within ±0.5%, and viscosity within ±5% between successive lots. If a higher alpha content is desired, then further purification treatment may be given the highly uniform pulp without impairing its uniformity. For instance, the pulp may then be given a boiling treatment in strong caustic and this treatment followed by a mild bleaching treatment, controlled as described above. An even higher degree of purity may be imparted to the pulp by mercerization in strong caustic solution. However, such additional purification treatments are, if employed, consistently applied to each succeeding lot of pulp to insure uniformity of properties between the successive batches of cellulose.

Therefore, by the process of this invention it has been found that a combination of the three elements comprising impregnation of the wood prior to digestion, uniform chlorine delignification, and control of the cuprammonium viscosity of the cellulose to a predetermined value by hypochlorite treatment permits the production of viscose pulp distinguished by the invariability of its properties between successive batches.

Following is a typical embodiment of the invention and it is to be understood that the various features set forth are by way of illustration only and are not to be construed in a limiting sense.

Slash pine wood less than 25 years old is used as the raw material and ammonium bisulfite solution as the digestion liquor. It should be understood, however, that the scope of the invention is not limited to the wood named, nor to the liquor composition. Any species of the well-known pulp woods is quite satisfactory and calcium or sodium bisulfite treating solutions may be employed, if desired.

The natural moisture content of the wood is maintained as nearly as possible by using freshly cut logs and removing the bark therefrom only when ready for shipping the wood. The logs are selected for freedom from defective material and from trees of uniform growth and of as high density as possible.

The bark is removed from the wood by means of the usual equipment and the logs thoroughly washed free of bark and dirt. They are then cut into chips, preferably ¼″ long, though the standard ½″–¾″ chips may be used with satisfactory results. It is desirable to spray the logs during chipping with water to protect the wood from the drying action of the air and the accelerated evaporation by frictional heat generated during the chipping. The wood will thus retain the greater part of its natural moisture, which is usually in excess of 50%. The preferred moisture content of the wood when charged into the digester is between 40% to 50%. If variations outside these limits are experienced for instance when the wood chips are boiled in water as described below, corrections in the volume and composition of the liquor added should be made to compensate for the excess or deficiency of water in the wood. By thus controlling the moisture content of the chips, the variation in the composition of the treating solution between successive digester charges is reduced to a minimum and a highly uniform treatment of the wood between successive batches is insured.

A very satisfactory treating liquor consists of ammonium bisulfite having a total $SO_2$ content of 6.0% and a combined $SO_2$ content of 1.1%.

The chips are charged into the digester and water, preferably at or near 100° C., is added in sufficient quantity to completely immerse them. When the chips have become partially saturated, steam is admitted into the digester by means of suitable ports located in the bottom of the digester and the mass of water and chips is boiled for 30 minutes under freely vented conditions. It is important that the chips be maintained completely immersed in the water during the boiling. At the end of 30 minutes boiling, the relief valve or other outlet to the atmosphere at the top of the digester is closed and the steam supply to the bottom ports is cut off. A suitable outlet in the bottom of the digester for draining is then opened and steam is admitted at the top of the digester through a suitable port above the water level. This forces the water surrounding the chips out of the digester. After all of the water has been drained from the chips in this manner, the water outlet at the bottom and the steam inlet at the top of the digester are both closed. This leaves the digester and the voids around the chips, the capillaries and interstices within the chips completely filled with steam at approximately 100° C.

The ammonium bisulfite liquor previously preheated to a temperature of the order of 90° C. is then pumped into the digester in sufficient quantity to attain a ratio of liquor to oven dry wood of the order of 6:1. When the liquor comes in contact with the chips the steam with which they are saturated is forced to condense. This creates a partial vacuum which acts to draw the cooking liquor into all the capillaries and interstices of the chips. In a short time, for example, 15 minutes or less, the chips become completely saturated with the treating liquor. Thus, by first removing all of the air from around and within the chips by the boiling and steaming practice, the chips become completely saturated with treating solution at a temperature just under 100° C. Since very little reaction, if any, between the sulfite liquor and the woody material occurs at this temperature, uniform and complete distribution of the reagent with all parts of the non-cellulosic material in the wood is thus effected before active digestion conditions are provided. This relationship of treating liquor and chips is ideal for initiating the desired reaction simultaneously throughout every portion of each chip upon the application of proper temperature.

Steam is now admitted into the digester and the temperature raised at a uniform rate to the order of 121° C. to 123° C. over a period of 3 hours, as shown by reference to curve AB, Figure 1. The temperature is held within this range for approximately 3 hours (curve BC, Figure 1). During this period the sulfonation of the non-cellulosic components of the wood takes place. Owing to the completeness with which the air has been evacuated from the digester and the chips before the temperature is raised to above 100° C., the pressure within the digester during the sulfonation cycle (curve BC, Figure 1) will be due solely to the heated treating solution and will not exceed 85 pounds per square inch. Gas reliefs to prevent the pressure exceeding the customary limit in the conventional digester equipment are therefore usually unnecessary. Thus, the usual variability in the concentration of the treating liquor during the sulfonation period, occasioned by the loss of sulfur dioxide gas by venting, is avoided and a treatment of the woody material with a liquor of nearly invariable composition between successive batches is insured.

At the end of the 3 hour sulfonation period, the temperature is raised to the order of 135° C. at a uniform rate over a period of about 1 hour (curve CD, Figure 1) and maintained closely at this level for from 2 to 4 hours (curve DE, Figure 1), depending upon the bleachability and viscosity desired in the digested pulp. The effect upon the bleachability and viscosity by varying the period of treatment at a temperature of the order of 135° C. will be described later in this example.

Hydrolysis of the sulfonated non-cellulosic material takes place satisfactorily during the treatment at temperatures in excess of 130° C., and in the present example the digestion is terminated at the end of 2 hours' treatment at 135° C. Gas reliefs to control the pressure in the digester below the permissible limit of the equipment may be practiced during the hydrolyzing cycle. Care is exercised that the venting is carried out in such a manner as to avoid reducing the temperature appreciably below the preferred level of the order of 135° C., since the rate of hydrolysis of the sulfonated, ligneous material is affected by variations in temperature. Short gas reliefs of less than 30 seconds each will accomplish the desired reduction in pressure without substantially lowering the temperature.

Upon the completion of the digestion schedule, the pulp is blown from the digester in the customary manner into a blow pit and washed with water, preferably as near 100° C. as possible, until it is neutral to litmus. The washed pulp is screened through a 0.012" to 0.015" screen and passed over a riffle box for further removal of heavy foreign material, such as knots, particles of bark, dirt and the like.

After the washing and screening, the pulp is conveyed to a suitable tank equipped with an agitation device capable of breaking down any fiber bundles or mats of fibers remaining in the pulp. This treatment is continued until the mass of pulp is completely defibered, i. e., each fiber is separated from its neighbor. In some cases, for example, where the pulp has been digested to a relatively high bleachability, it may be necessary in addition to the above treatment to classify the product to remove bundles or mats of fibers which may have survived the defibering treatment.

By the foregoing digestion schedule, from 50 to 52 pounds or more of oven dry pulp are obtained from each 100 pounds of oven dry slash pine wood used. The screened pulp will have approximately the following analysis:

| | |
|---|---|
| Alpha cellulose_____per cent_ | 87.9 |
| Soda solubility_____do___ | 24.6 |
| Ash _____do___ | 0.76 |
| Cuprammonium viscosity_____(ctps.)_ | 41.1 |
| Bleachability _____per cent_ | 22.7 |
| Pentosans _____do___ | 6.8 |

It will be noted that the retention of the native alpha cellulose is 44 to 46 pounds or more of each 100 pounds of oven dry slash pine wood used.

The digestion schedule just described is designed to produce a high yield of raw pulp of relatively high viscosity and bleachability. The same schedule and liquor composition applied to other coniferous woods such as spruce, or, to deciduous woods such as black gum, yellow birch and the like will result in raw pulps whose viscosities and bleachabilities may vary to some extent from the above values. These variations will also occur with wood of the same species obtained from different geographical areas and of varying growth conditions. Consequently, it is usually necessary to determine the precise adjustment of the time-temperature schedule to give a pulp of the desired bleach and viscosity characteristics by carrying out one or more experimental digestions on the quality of wood to be used in continuous operation. The adjustments in the digesting practice for controlling the bleachability and viscosity of the raw pulp are conveniently made by varying the time or the temperature, in some cases both. To obtain a maximum yield of raw pulp having a high bleachability and high cuprammonium viscosity, the average temperature should be held as low as possible and the time of treatment prolonged by experiment to give a pulp that can be readily and completely defibered.

If a lower viscosity of raw material is desired, i. e., less than 25 to 30 centipoises, the digestion can be carried out at a somewhat higher temperature, for example, 140° C. to 145° C., for the same length of time. Such higher temperatures also result in lower bleachability.

The washed, screened pulp is transferred to a gas tight chlorination tank equipped with high efficiency agitation and its consistency adjusted to between 3% to 3½%. It will be noted that a maximum exposed surface area of ligneous material in the pulp has been provided by the care exercised in separating each fiber from its neighbor. The non-cellulosic material is, therefore, in a nearly ideal condition of accessibility to the treating reagent.

For the attainment of the highest efficiency in the use of reagent in purifying raw cellulosic pulp, the amount of chlorine and its method of application to the pulp is important. A quantity of chlorine is added to the pulp slurry which is just sufficient to satisfy the demand of the ligneous material present which is immediately responsive to chlorine. This amount expressed in pounds per each 100 pounds of oven dry pulp is arrived at by using 16% of the bleach value of the raw pulp. Within the range of bleachabilities of 5% to 50%, this factor of 16% (used in computing the number of pounds of chlorine to be added to each 100 pounds of oven dry pulp) results in the addition of just sufficient chlorine to effect the complete chlorination of the immediately reactive, ligneous material within less than the order of 10 minutes. It has the further important effect of bringing the raw pulps of widely varying bleachabilities to a high degree of uniformity with respect to residual, oxidizable material after the products of chlorination have been removed by a subsequent caustisizing treatment.

The required amount of chlorine gas is incorporated in the pulp slurry at a uniform rate of flow in less than 30 minutes. The efficiency of the use of the reagent is increased by making the addition to the slurry in as short time as possible. Care must be taken, however, that the addition of the gas is made under conditions which insure its uniform distribution throughout the pulp so that each part of the ligneous material will receive just its quota of reagent. The chlorine will be substantially exhausted in an additional 5 to 10 minutes, but the treatment is allowed to continue for a total of approximately 45 minutes. This additional time of contact is to permit the hydrochloric acid formed by the chlorination treatment to assist in the removal of ash constituents. At the end of the chlorination, a sufficient amount of sodium hydroxide is added to effect an initial equilibrium concentration of the solution of the order of 1%. The treatment consistency is preferably from 2% to 4%, but may be higher if agitation equipment is available to properly mix slurries of high consistency. The concentration of the sodium hydroxide solution added to the pulp slurry upon the termination of the chlorination should not exceed 7% since stronger solutions coming in contact with the chlorinated pulp stock, even momentarily, have a tendency to "set" the chlorinated compounds on the pulp, making them more difficult to remove by subsequent treatment.

The pulp slurry is brought to the order of 100° C. as rapidly as the existing facilities will permit and held at about 100° C. for the order of 30 minutes. It is then promptly transferred to a continuous filter or centrifuge, the liquor drained and the pulp thoroughly washed with water, preferably until neutral.

The washed pulp is now ready for a hypochlorite bleach, the purpose of which is twofold: (1) to eliminate the residual, oxidizable material remaining in the pulp, (2) to adjust the viscosity of the cellulose to the proper level required at this stage of its purification in order to yield the desired viscosity at its final stage of refinement. It has been found that the viscosity of the final purified cellulose will be approximately 75% to 85% of its value at the end of the hypochlorite bleach treatment. In general, the higher the viscosity of the purified end product, the greater will be the spread between the viscosity value at the end of the hypochlorite treatment and such final viscosity. For example, if a viscosity of 30 centipoises for the final purified cellulose is desired, the pulp viscosity should be reduced in the hypochlorite treatment to approximately 35 centipoises. If an end product of 18 centipoises is desired, the cuprammonium viscosity of the cellulose should be reduced by means of the hypochlorite treatment to approximately 20 centipoises.

In carrying out the bleaching step of this example, the required volume of hypochlorite solution to give 2.5 pounds of bleaching powder (calculated on the basis of 35% available chlorine) for each 100 pounds of pulp is added to the pulp slurry which has previously been adjusted to a consistency of 2.7%. This addition of reagent will give a concentration of bleaching powder in the treating solution at the start of the reaction of 0.067%. The hypochlorite is added in the form of a solution containing 60–70 grams of bleaching powder per liter and saturated with lime. The bleaching reaction is allowed to proceed four hours at a temperature of 25° C. which results in a consumption of approximately 50% of the active reagent present. Control and close duplication of the pH conditions during the bleaching step of successive batches is essential for reproduction of the rate and extent of viscosity reduction. The preferred practice is to have the pH at the start of the reaction at about 9.4 and allow it to decrease uniformly to a value of about 8.7 at the end of the treatment. The lower limit of pH for satisfactory bleaching of pulps intended for use in derivatives is of the order of 8.0.

The chlorination and causticization steps which precede the hypochlorite bleach produce marked changes in the properties of the cellulose. An analysis of a typical chlorinated and causticized pulp showed the following:

| | |
|---|---|
| Alpha cellulose_____per cent__ | 94.9 |
| Soda solubility_____do____ | 6.5 |
| Cuprammonium viscosity_____(ctps.)__ | 54.1 |
| Bleachability_____per cent__ | 1.1 |
| Pentosans_____do____ | 5.4 |

The bleaching treatment just described affects primarily the cuprammonium viscosity, the color of the cellulose and the amount of oxidizable material present. During the course of the bleaching step, the cuprammonium viscosity will be reduced to about 43 centipoises, the color of the cellulose improved from a reflectance value of about 82.4% to a value of about 93.4% and the bleachability reduced to a value of about 0.4%.

If greater reduction in the viscosity of the pulp is desired than illustrated by the present example, this may be effected by employing higher bleaching temperatures or by adding a greater percentage of bleaching powder. However, either practice tends to undesirably impair the properties of the pump and furthermore is less economical than providing a raw pulp of lower initial viscosity obtained by proper adjustment of the digestion conditions.

Figures 3 and 4 show the nature of the change in these properties of the celluloses, which are appreciably affected during the bleaching treatment, produced by varying some of the conditions of the hypochlorite bleach. The property most difficult to control is the cuprammonium viscosity. Variations such as the rate and degree of agitation, pH during bleaching, size of batch, direct or indirect heating, rate of heating, presence of metallic contaminants, etc. are factors in the control of viscosity during bleaching. We have found a control viscosity determination to be a practical method for obtaining a substantially constant cuprammonium viscosity of successive batches of pulp after the completion of the hypochlorite bleach. A curve showing the change in viscosity with time of bleaching should first be determined on a number of successive lots from the same wood supply going through the process. This is desirable in order that the cumulative effects may be known of the natural variations in the raw material and the minor unavoidable variations in the processing steps arising from the limitations of accuracy in measuring the weight and consistency of pulp, weight of reagents and the like. When these curves are established, a single control viscosity determination, made after some selected elapsed time of bleaching, will suffice for each lot of pulp in process. From this control value, the curve may be extrapolated and the proper adjustment in the bleaching time made to insure the desired viscosity of the pulp upon the termination of the bleaching. Reference to Figure 4 shows that although in the last two hours of the bleaching the change in viscosity with time is small, proper adjustments in time can be made to readily overcome differences of, for instance, two to four centipoises between successive lots. These adjustments in time may be made with no detriment to the other pulp properties for the oxidizable material in the cellulose has been substantially reacted with during the first hour of the treatment and there is practically no change in the alpha cellulose and soda soluble contents even though the bleaching treatment should be prolonged two hours or more beyond the four hours preferably chosen and used in this example.

At the completion of the bleach, the solution is drained and the pulp washed, preferably until neutral. It is then dewatered by means of any suitable device, such as an Oliver filter, screw press or pressing rolls, until its consistency is at least 25%.

The analysis of a typical sample of the purified pulp at this point is:

| | |
|---|---|
| Alpha cellulose_____per cent__ | 94.6 |
| Soda solubility_____do____ | 7.9 |
| Cuprammonium viscosity_____(ctps.)__ | 43.0 |
| Bleachability_____per cent__ | 0.35 |
| Pentosan_____do____ | 5.2 |
| Ash_____do____ | 0.10 |

The yield of product is from about 42–45 pounds or more from each 100 pounds of oven dry wood and, as indicated by the analysis, the purity is much higher than the commercially available viscose pulps, which usually have alpha and soda soluble values of 88% to 90% and 10% to 20% respectively.

However, an even higher quality material may be obtained by a further treatment of the pulp in the following manner: The pulp cake is added to a solution of caustic soda of such strength that when mixed with the water held by the pulp the equilibrium concentration will be of the order of 7%. The temperature of the caustic solution to which the pulp cake is added may vary from 40° C. to the boiling temperature, but is preferably at least 50° C. The consistency at which the alkaline treatment is carried out may vary between 4% to 12%, depending entirely upon the type and efficiency of the agitation aquipment available. The treatment at the boiling temperature is continued for ½ to 3 hours with continuous agitation under conditions which allow a minimum amount of oxygen to come in contact with the pulp. This is conveniently effected by using a closed vessel, heating the pulp slurry with direct steam, and allowing steam to escape from the tank through a partially opened valve above the liquor level. An atmosphere of steam in contact with the pulp throughout the treatment is thereby provided.

Upon the completion of the boiling, the pulp is drained free of excess solution and washed with water until neutral.

The pulp may then be given another bleach designed as described above to further lower the viscosity or it may be given a very light bleach using only 0.5 to 1.0% hypochlorite to further increase its whiteness.

An analysis of a typical sample of the purified pulp is:

| | | |
|---|---|---|
| Alpha cellulose | per cent | 96.7 |
| Soda solubility | do | 2.9 |
| Cuprammonium viscosity | (ctps.) | 32.0 |
| Bleachability | per cent | 0.25 |
| Pentosan | do | 3.0 |
| Ash | do | 0.10 |

The yield of purified cellulosic pulp is from about 40-44 pounds or more from each 100 pounds of oven dry wood, depending on the wood species employed.

The material is especially adapted to economical conversion into viscose products of improved properties and quality. A characteristic of the viscose yarn from the cellulose product of the invention is a considerably greater tenacity in both the wet and dry state. The high alpha and low soda solubility and the nearly invariable values between successive batches to which they may be duplicated result in higher yields of viscose yarn of improved color and quality. In addition, this high purity permits a more economical use of caustic reagent in the formation of alkali cellulose.

It should be noted that the purity of the cellulosic product approaches that of cotton linters used for viscose manufacture. Furthermore, it is believed that the close duplicability of purity as measured by the almost invariable alpha and soda soluble values between successive lots permits corresponding uniformity and exceptionally good spinning properties in the viscose product. The high cuprammonium viscosities of the purified pulp, readily attained by the invention, make it possible to produce viscose filaments of high viscosity, which property is believed to impart better wearing quality to the fabric.

The exceptional uniformity of the viscosity of the pulp between successive batches reduces, and may even eliminate, the necessity of the carefully controlled blending of the pulp stock which is the nearly universal practice in viscose manufacture. The high yield of purified pulp obtainable from cheap woods combined with an efficient conversion process, provides an exceptionally low cost cellulosic material for the manufacture of viscose products.

Wood cellulose fibers when treated by ordinary purification methods yield an entirely heterogeneous purified cellulose. The physical characteristics and chemical reactivity of the purified fibers vary inconsistently from batch to batch and this difficulty has been paramount in preventing a more extensive and satisfactory use of wood pulp in the chemical cellulose field.

It is believed that a major portion of the difficulty experienced in refining the wood pulps by the prior processes is due to the morphology of the fiber itself, and is not inherent in the impurities contained therein.

The difficulty has been overcome in the present invention by recognizing the influence of the complex structure of the fiber and providing treatments to overcome this influence and insure a very uniform product from batch to batch.

In attaining this objective, the underlying principle of the invention goes deeper into the problem than merely giving consideration to the wood subdivision units in the first instance and to the cellulosic pulp in the purification steps. It is recognized that the impurities to be removed from the wood chips are not only distributed as a matrix encasing vast aggregates of fibers but that each fiber contains within its complex cell wall structure impurities which must likewise be eliminated; consequently, the unit of treatment is the individual fiber rather than the vast aggregate of fibers comprising the chip. Therefore, it is necessary to insure the uniform association of reagent about and within the individual fibers composing the chip. Likewise, in considering the proper conditions for treating the cellulosic pulp with reagents, the impurities existing within the cell walls of each individual fiber are provided with their quota of reagent.

It is believed that this is a new concept of the problem involved in producing purified wood cellulose of such uniformity between successive batches as to render it entirely satisfactory for conversion into viscose products of superior properties. The process of the present invention is based on this concept and results in a cellulosic pulp distinguished by superior and nearly invariable properties between successive lots.

The foregoing example serves to point out in a detailed manner certain embodiments of the present invention. However, the scope of the invention will be more readily understood and its implications will become more apparent in view of the following considerations of some of the more important aspects of the invention and its processes and products.

In the foregoing description it will be noted that conditions of each treatment are invariably provided which insure a high degree of uniformity of reaction between the reagent employed and the material being treated. This is accomplished by first providing effective and efficient means for dispersing the reagent, in proper amount, uniformly throughout every part of the material to be reacted upon at a temperature below that at which the desired reaction may proceed actively. Thus no substantial reaction is permitted to occur until the conditions are such that the reaction may be initiated simultaneously on every part of the material. This provision insures an exceptional homogeneity of product at each stage of the conversion of the wood chips into purified cellulosic pulp. It is regarded as an especially important feature of the invention.

Beginning with the treatment of the wood chips, the normal air content of the wood is first expelled and provision made to effectually prevent the re-entry of air while the digesting reagent is being intimately distributed through the capillaries and interstices of each chip, even to the usually inaccessible portions. This is accomplished at a temperature not exceeding 100° C. As a consequence, each wood chip is provided with its complement of reagent so distributed that upon raising the temperature to the desired range in which the reaction proceeds, rapidly, every portion of each chip is reacted upon substantially simultaneously. The result of this practice is a shortening of the time necessary to complete the digestion at any given temperature and a remarkable uniformity of reaction in all portions of each chip. Irrespective of the extent to which the delignification is carried, the remaining ligneous material in the resulting pulp is quite uniformly distributed with respect to the individual fibers, the cellulosic fibers are subjected to a less drastic treatment because of the shortened time required for the digestion and/or the lower temperatures which may be employed.

Because of the uniformity of the reaction of the digesting liquors under these conditions, pulps of a considerably higher bleachability are capable of being completely defibered by relatively mild mechanical treatment. This circumstance is of practical importance, especially where an exceptionaly high solution viscosity of the purified cellulosic pulp is desired. In such cases it is advantageous to provide defiberable pulp which has been digested under such lenient condition that a minimum amount of depolymerization of the cellulose molecules is effected, i. e., so that the pulp will have a very high solution viscosity.

Likewise, in each purification treatment, appropriate provision is made for insuring the accessibility of the reagent to the impurities in the cellulosic pulp which it is desired to remove either before or simultaneously with supplying the reactive conditions. This results in a uniform progressive removal of impurities and imparts high permeability and reactivity to the purified pulp.

In carrying out the present invention it is desirable to use water of very high purity, preferably free of or having a very low and constant amount of salts of such metals as iron and manganese. Such metals tend to have a catalytic effect in purification and subsequent treatments. In order to have uniformity between batches it is desirable, if such metals are present, to have no appreciable variation in their quantity in the water used in processing successive batches of pulp.

It will be noted that the present example employs slash pine wood as the base raw material. This and other highly resinous pine species have long been regarded as unsuitable for pulping by the sulfite process. The present invention completely overcomes the pitch problem, usually encountered in the use of pine wood, and consequently provides a practical and economical means of utilizing resinous wood species in the manufacture of chemical cellulose for derivative purposes.

In the foregoing specification and following claims, terms have been used having the following meanings:

"Soda soluble material" is defined as that portion of a cellulosic sample dissolved when it is subjected to the action of 7.14% sodium hydroxide solution at the boiling point of water for 3 hours by a refinement of the method of Griffin, "Technical Methods of Analysis," 492 (1927 ed.), described in U. S. Patent No. 2,185,776, issued to Lyle Sheldon et al., January 2, 1940, pages 2 and 3.

"Alpha cellulose" is defined as that portion of a sample of cellulosic material not dissolved by 17.5% sodium hydroxide solution at 20° C., determined by a refinement of the method desscribed by H. F. Lewis in "Technical Association Papers," Series XVII, #1, 436 (1934), described in U. S. Patent No. 2,185,776, issued to Lyle Sheldon et al., January 2, 1940, page 2.

"Bleachability of cellulose," as used herein, is a measure of the materials oxidizable by potassium permanganate in the presence of an acid under specific conditions, and is expressed in terms of standard bleaching powder containing 35% available chlorine. A detailed description of the method, including the conversion table for expressing the permanganate number in terms of per cent bleaching powder of 35% available chlorine, was published by T. A. P. P. I., Series XVII, #1, 146 (1934), "Permanganate number of pulp" by R. N. Wiles.

"Cuprammonium viscosity," as used herein, means the viscosity number or value obtained according to the following method: The cuprammonium solution was prepared by the action of air on electrolytic copper in the presence of strong ammonia water. The copper concentration of the solutions employed for viscosity determinations was 30, ± 2 g. per liter and the ammonia content was 165 g., ± 2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society Committee on the Viscosity of Cellulose (Journal of Industrial & Engineering Chemistry, I, #49; 1929). The time of flow in seconds was converted to centipoises on the basis of the calibration of the pipet with oils of known viscosity in centipoises obtained from the United States Bureau of Standards.

"Color of cellulose." The color of the cellulose is measured by the amount of light reflected from a pad of cellulose. This is determined by using a photo-electric cell and is expressed as percent of the range from black to the white of a magnesium carbonate block.

We claim:

1. The process of producing successive lots of purified unmercerized sulfite pulps comprising providing unbleached pulps by thoroughly boiling and impregnating wood chips with acid sulfite delignifying solutions at below active reaction temperatures, digesting said chips in said solutions to form pulps, defibering each of said pulps so that substantially no fiber bundles or mats remain, uniformly adding to said pulps in water slurries an amount of chlorine in water solution which will exhaust in from 10–30 minutes and treating the corresponding pulp at least until exhaustion of chlorine in each respective slurry, subjecting each of said chlorinated pulps to the action of a dilute caustic solution at elevated temperature and for a sufficient time within one hour to dissolve the chlorinated compounds therein and reduce the bleach values of said pulps to a substantially uniform level below 5%, treating said pulps with a hypochlorite bleach under conditions of concentration, time, temperature, pH and the like, attaining the desired purifying and decolorizing action and without exhausting the bleach, and terminating the bleach upon the attainment of the desired viscosity reduction and before exhaustion of the bleach, and treating said bleached pulps with dilute caustic soda at greater than 50° C. for at least one hour, all of said treatments being carried out without substantial degradation of the pulp so that each pulp has an alpha cellulose value not less than 95% and soda solubility not greater than 4%, with maximum deviations therefrom in any lot of not more than 0.5% and a predetermined viscosity between 5–30 ctps. with maximum deviations of not more than 5%.

2. The process as set forth in claim 1 wherein the liquid in which the wood chips are boiled is a bisulfite solution and the wood chips are maintained submerged in such solution from the boiling treatment continually until impregnation with said solution is complete.

3. The process set forth in claim 1 wherein the treatments after introduction of the chlorine are continued for substantial periods after the exhaustion of the introduced chlorine so as to subject the respective pulps to the action of any hydrochloric acid resulting from the treatment.

4. The process set forth in claim 1 wherein the termination of the hypochlorite bleach is upon the attainment of the desired viscosity reduction and before exhaustion of the bleach and when the rate of viscosity reduction has been substantially reduced.

FREDRICH OLSEN.
LIONEL GOFF.
LYLE MELVIN SHELDON.